United States Patent
Rexius

[19]

[11] Patent Number: 6,036,406
[45] Date of Patent: Mar. 14, 2000

[54] MOBILE BLOWER SYSTEM FOR PLANTING GRASS SEED

[75] Inventor: Arlen L. Rexius, Eugene, Oreg.

[73] Assignee: Rexius Forest By-Products, Inc., Eugene, Oreg.

[21] Appl. No.: 08/929,740

[22] Filed: Sep. 15, 1997

[51] Int. Cl.[7] .................................................. B60P 1/60
[52] U.S. Cl. ................. 406/39; 406/38; 406/39; 406/47; 406/48; 406/65; 406/120
[58] Field of Search .................................. 406/38, 39, 47, 406/48, 65, 120

[56] References Cited

U.S. PATENT DOCUMENTS

| | | | |
|---|---|---|---|
| 4,219,966 | 9/1980 | McCalister | 47/9 |
| 4,793,742 | 12/1988 | Strand | 406/79 |
| 5,125,583 | 6/1992 | Strand | 239/655 |
| 5,181,804 | 1/1993 | Wysong et al. | 406/67 |
| 5,361,711 | 11/1994 | Beyerl | 111/127 |

FOREIGN PATENT DOCUMENTS 1150319  6/1963  Germany ................................ 406/120

Primary Examiner—Christopher P. Ellis
Assistant Examiner—Jeffrey A. Shapiro
Attorney, Agent, or Firm—James D. Givnan, Jr.

[57] ABSTRACT

A truck is equipped with a grass seed hopper from which seed is fed into a blower pressurized conduit air flow by an air lock feeder at a first station. A motor with speed control drives the feeder and determines the rate of seed discharge. A tank on the truck permits the pumped flow of tank contents, water and/or fertilizer, into the conduit carried pressurized air flow. Organic material carried by the truck is conveyed forward by a moving floor toward augers which feed the organic material to a powered mixer for breaking up of the material to ensure passage of loose material into a rotary feeder at a second station. The feeder discharges into a mixing chamber whereat grass seed, discharged from the pressurized conduit, mixes with the organic material for subsequent discharge onto a ground surface via a flexible hose.

6 Claims, 1 Drawing Sheet

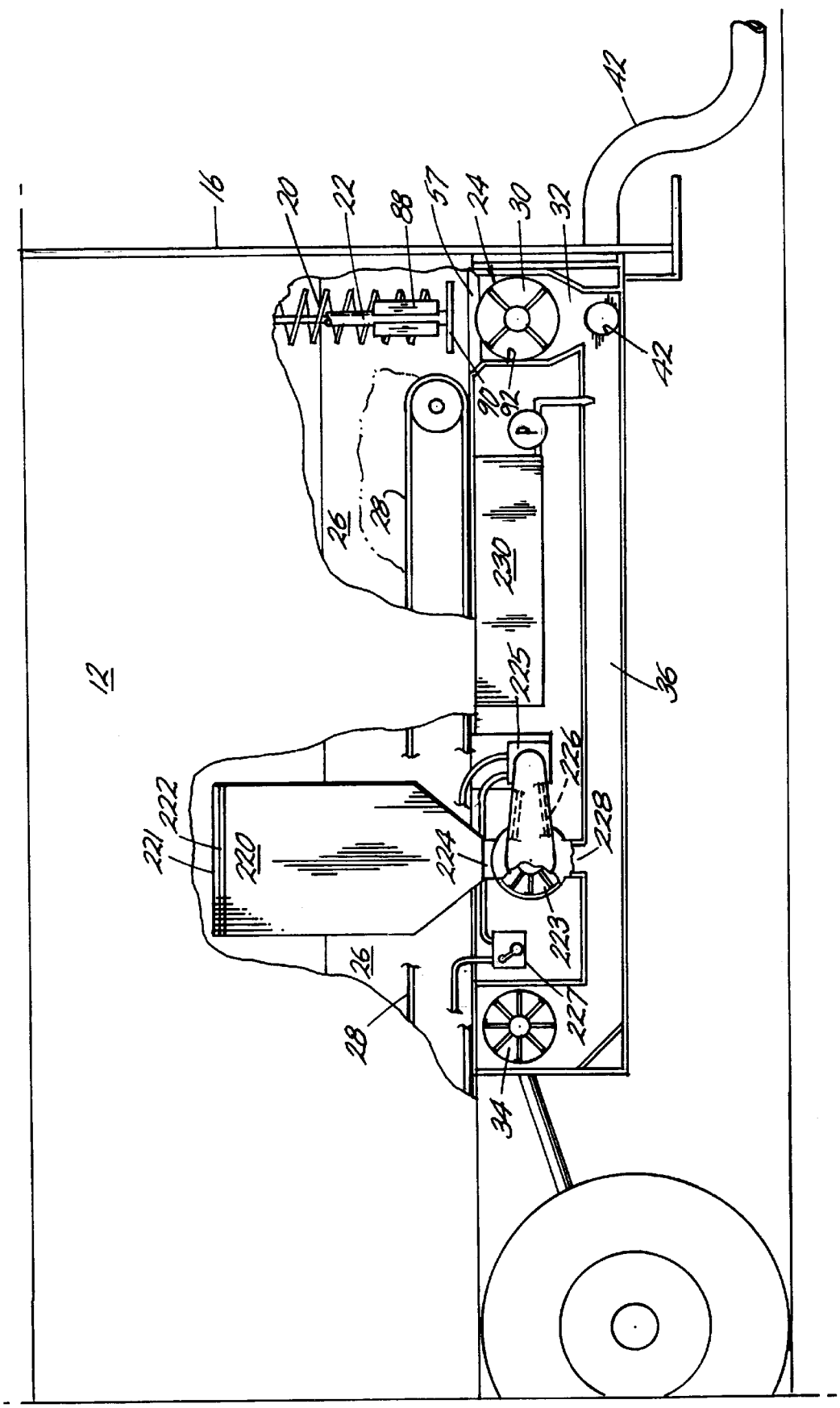

MOBILE BLOWER SYSTEM FOR PLANTING GRASS SEED

BACKGROUND OF THE INVENTION

The present invention concerns the spreading of grass seed on an area being planted simultaneously with the deposit of mulch or other growth enhancing matter over a ground surface.

U.S. Pat. No. 4,793,742 and 5,125,583 show a truck equipped with multiple boom assemblies through which pressurized air from a blower is directed. Each boom is served by a separate mixing chamber in which particulate material is deposited into an air flow for each boom. No provision is made for the subsequent addition of material to the air flow passing through each boom.

U.S. Pat. No. 5,361,711 discloses a truck equipped with a tank containing an aqueous mixture of seed and soil conditioning materials. Additionally carried by the truck is a blower assembly into which may be fed dry material such as straw or hay which is subjected to a blower for discharge onto a ground surface by a directional discharge spout. The blower assembly functions separately from those components mixing and discharging the aqueous mixture.

U.S. Pat. No. 4,219,966 discloses a method of treating grass seed with a fertilizer and an adhesive which is then fed via an auger for mixing same with cellulose. A blower at a work site is utilized for spreading the mixed seed, fertilizer, adhesive and cellulose mixture. Water may be added prior to blower discharge of the mixture.

U.S. Pat. No. 5,181,804 is of interest in that a conveyor has right and left hand flights to feed material toward a central discharge outlet in communication with a rotary air valve having knife components and rotary vanes. An inlet directs presurized air between successive pairs of vanes to discharge material confined between said vanes in an axial direction into an outlet.

SUMMARY OF THE PRESENT INVENTION

The present invention is directed toward the provision of a feeder mechanism in place along an air conduit for the entrainment of grass seed and/or granular material promoting the growth of grass for subsequent mixing with organic material prior to discharge onto a ground surface.

The feeder mechanism is vehicle mounted and receives a flow of material from a hopper or other storage receptacle and deposits the material into a conduit through which a pressurized air flow is conveyed. Feeder speed and the discharge rate may be controlled by the regulation of a power source such as a hydraulically powered motor. The air flow carrying the feeder output is directed toward a mixing chamber wherein the seed and other associated material, e.g., granular fertilizer, is mixed with particulate material including wood by-products and compost.

The present feed mechanism permits the planting of grass seed using a blower with the simultaneous application of growth enhancing matter to a small site, such as a residential lot, or over a large area without undesirable passage of a truck over the ground surface.

Important objectives of the present invention include the provision of a feeder for grass seed and/or grass growing material into a pressurized air flow for subsequent mixing with organic material in the mixing chamber on a mobile base for the planting of seed and growth supporting material in a single application and through a lightweight flexible hose.

BRIEF DESCRIPTION OF THE DRAWING

In the drawing, the FIGURE shown is a partial side elevational view of a truck with fragments broken away for purposes of illustration.

DETAILED DESCRIPTION OF THE PREFERRED EMBODIMENTS

U.S. Pat. No. 5,556,237 issued to the present inventor is incorporated herein by reference.

With continuing attention to the drawing, applied reference numerals indicate parts similarly hereinafter identified. Briefly, said patent discloses a container truck including a trailer 12 which may be open at its top to receive a load of loose particulate such as, for example, wood by-products and compost. A trailer rear door is at 16. Floor structure of the trailer includes inclined floor sides as at 26 with both terminating downwardly adjacent opposite sides of a central moving floor 28 which conveys the organic material rearwardly toward door 16 and a pair of inwardly directed augers as at 20 carried by the door each serving to break up and feed loose particulate toward a centrally located mixer 22 adjacent the discharge end of the moving floor. Mixer 22 includes a centrally disposed, powered shaft, also journalled on door 16 and fitted with paddles 88 and radially extending rods 90 to break up any particulate that may otherwise tend to bridge over an outlet opening 57 in the trailer floor. Below opening 57 is a rotary feeder 24 housed within upright ducting 92. Radially extending walls on feeder 24 define chambers 30 which, during powered rotation of the feeder, receive amounts of loose particulate which is discharged downwardly into a mixing chamber 32. The radial length of the feeder walls provide outer edges which cooperate with the inner surfaces of ducting 92 to constitute a barrier to prevent an upward flow of pressurized air from ducting 36 originating at a blower 34. A hose 42 receives pressurized air from blower 34 along with the loose particulate discharged from feeder 24 as disclosed in the earlier noted patent incorporated herein by reference.

A hopper at 220 on the trailer is provided with closure 221 and air seal 222 for the reception of grass seed alone or a mix of same with growth enhancing fertilizer or a weed killer in particulate forms. A rotary feeder at 223, below a hopper outlet at 224, is driven by a hydraulic motor 225 as by a sprocket and chain drive 226. A control valve 227 regulates motor speed and the rate at which hopper contents are discharged into ducting 36 via an outlet 228.

A liquid transporting tank 230 is carried by trailer 12 with a pump P driven as by a hydraulic motor (not shown) serves to inject water into ducting 36 to inhibit particulate from becoming airborne when discharged from hose 42 which has an inlet end in direct communication with mixing chamber 32. Tank 230 may be utilized to transport and provide a source of other liquids including a fertilizer and weed killer solutions.

In use, the container area of the trailer 12 is provided with the selected organic material, usually compost, to best suit the seeding task at hand. The rate of seed discharge by feeder 223 is set to provide the amount of seed required for the flow of organic material from feeder 24 controlled in a remote manner per the previous patent disclosure incorporated herein by reference.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A mobile apparatus in place on a vehicle for transporting and dispersing a mixture of grass seed and organic material onto a ground surface adjacent the vehicle, said mobile apparatus including;

a blower, a conduit receiving air discharged by said blower, a hopper for the crass seed, powered means for regulating grass seed discharge into said conduit at a first station along the conduit, a container for the organic material, feed means at a second station spaced along said conduit from said first station for regulating entry of the organic material into said conduit, and a discharge member in communication with said conduit and through which the organic material and the seed mixed therewith is discharged onto the ground surface.

2. The mobile apparatus claimed in claim 1 wherein said powered means includes an air-lock feeder, a hydraulic motor and drive means coupled to said feeder, and control for regulating motor speed to vary seed discharge into said conduit.

3. The mobile apparatus claimed in claim 2 wherein said control valve is manually operable.

4. The apparatus claimed in claim 1 additionally including a tank on the vehicle, an outlet for said tank in said conduit, and pump means for injecting tank contents into said conduit.

5. The mobile apparatus claimed in claim 2 wherein said hopper includes an air seal.

6. A mobile apparatus in place on a vehicle for transporting and dispersing mixed grass seed and organic material onto a ground surface adjacent the vehicle, said mobile apparatus including:

a blower, a conduit receiving air discharged by said blower, a hopper for the grass seed, powered means for regulating grass seed discharge into said conduit at a first station along the conduit, a container for the organic material, feed means at a second station spaced along said conduit from said first station for regulating entry of the organic material into said conduit, a tank and an outlet for said tank in said conduit and pump means for injecting tank contents into said conduit, and a discharge member in communication with said conduit through which the organic material and the seed mixed therewith is discharged onto the ground surface.

* * * * *